Figure 1:
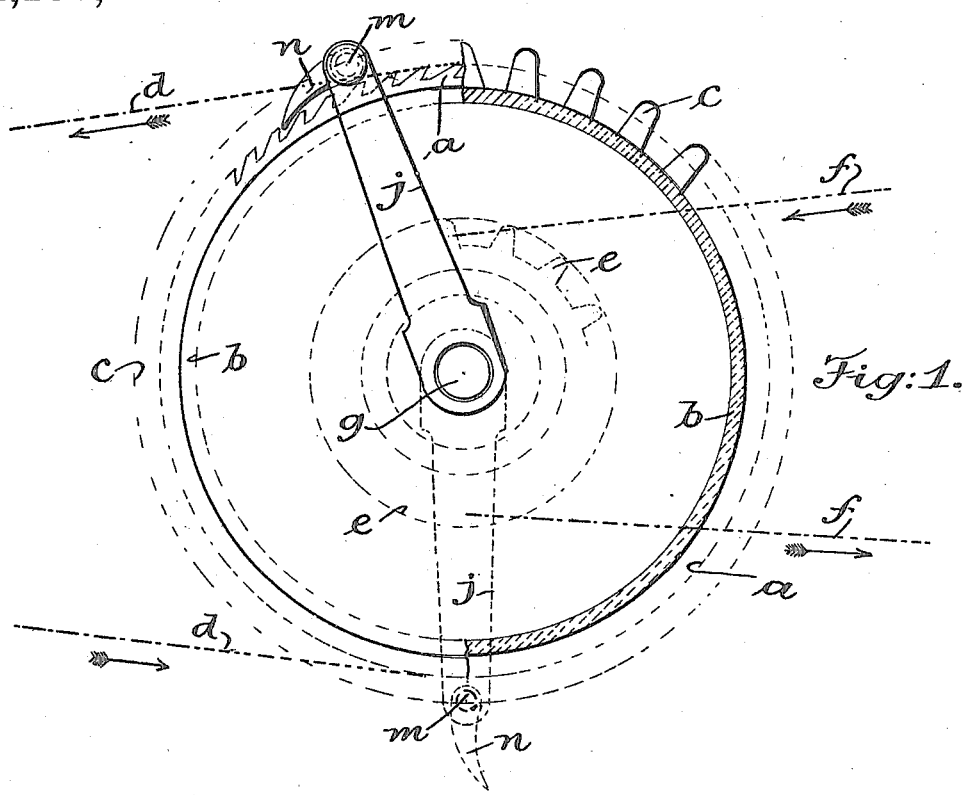
Figure 2:
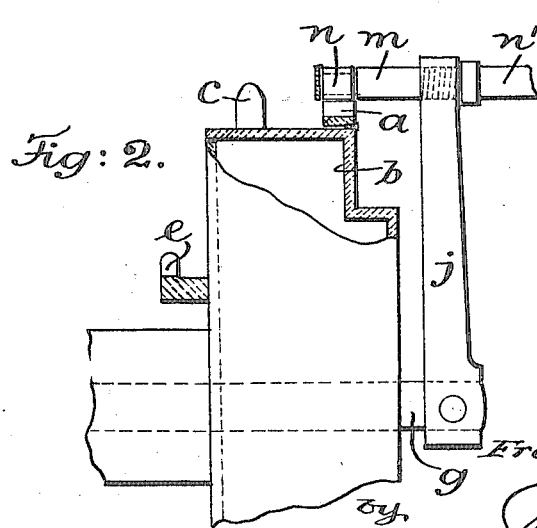

F. D. JOHNSON.
KICK START GEAR FOR MOTOR CYCLES.
APPLICATION FILED FEB. 2, 1915.

1,180,154. Patented Apr. 18, 1916.

Witnesses:—

Inventor
Francis D. Johnson
by
Attorney

UNITED STATES PATENT OFFICE.

FRANCIS DEBNEY JOHNSON, OF MOUNT LAWLEY, NEAR PERTH, WESTERN AUSTRALIA, AUSTRALIA.

KICK START-GEAR FOR MOTOR-CYCLES.

1,180,154. Specification of Letters Patent. Patented Apr. 18, 1916.

Application filed February 2, 1915. Serial No. 5,671.

*To all whom it may concern:*

Be it known that I, FRANCIS DEBNEY JOHNSON, a subject of the King of Great Britain, and residing at Almondbury Road, Mount Lawley, near Perth, Western Australia, Commonwealth of Australia, have invented certain new and useful Improvements in Kick Start-Gear for Motor-Cycles, of which the following is a specification.

This invention has been principally devised for use with Yale motor cycles but it is also applicable for all other types of motor cycles and its object is to provide an improved kick start gear whereby the engine can be started when the cycle is at a standstill and resting on both wheels and the rider seated on the cycle.

This improved gear is operated by the rider giving a downward foot push or kick movement and whereby the needful initial rotations are imparted to the engine shaft for the purpose of starting said engine. The use of my invention does not disturb the existing construction of the cycle but is in the nature of an adjunct or addition to operate with the existing gear of the cycle.

In order that my invention may be clearly understood reference will be made to the attached drawing wherein—

Figure —1— is a side view showing the invention as attached to the usual gear case of the cycle and Fig. —2— is an end broken view of Fig. —1— certain parts being shown in section for the sake of clearness.

Referring to said drawings this kick start gear consists essentially of two members which work coöperatively with each other and they consist first—in the employment of a single ratchet band or rim as $a$ secured on the outer periphery of the existing gear case $b$ and which case rotates and is carried on the usual fixed tubular and axial bearing shaft of the cycle. This gear case $b$ also carries the sprocket wheel $c$ which by chain $d$ conveys the initial motion to the engine while after the engine has been started said sprocket wheel $c$ becomes the driven wheel from the engine by said chain $d$ and the gear case in turn by sprocket $e$ and chain $f$ transmits the driving motion to the usual rear wheel of the cycle as denoted by arrow. In the core of the existing axial tubular shaft is rotatably mounted the spindle $g$ to which the pedal crank arms $j$ are secured in the well known manner in cycle constructions.

The second feature of my invention resides in the use and combination of an inward extension as $m$ of one of the pedal spindles $n^1$ and on this extension member $m$ is pivotally carried a pawl $n$ which is adapted to engage and disengage with the aforesaid ratchet rim or band $a$. This extension member as $m$ may be obviously secured otherwise to the pedal arm as $j$. This pawl $n$ acts as the direct driving agent for the ratchet $a$ which in turn by the agency of the wheel $c$ and chain $d$ conveys the initial motion to the engine shaft as denoted by arrow and as soon as said pawl $n$ arrives at the lowest point as shown in broken lines in Fig. —1— it drops by gravity to the idle and in-operative position and consequently out of engagement with the ratchet band $a$ until again brought into requisition at the top point of engagement with said ratchet band or rim $a$.

To use the invention the rider sits on (or may stand against) the cycle and brings the pedal arm $j$ and the thereto attached pawl $n$ to the high point so causing said pawl $n$ to become operative with the ratchet $a$. The rider thereupon pushes or kicks down the pedal of the cycle in the usual way thus describing approximately one half of the circle and which unit of rotation imparts the needful number of revolutions to the engine shaft for the effective starting of the engine. It being understood that the sprocket wheel $c$ is geared accordingly for such result. The pedals and pawl $n$ remain at the lowest point by gravity until again brought into use and the pedals in such idle or inoperative position act as foot rests and auxiliary to the ordinary fixed foot rests of the cycle.

What I claim as my invention and desire to secure by Letters Patent is—

In a starting apparatus for motorcycles, the combination, with the pedal crank arms and the rotatable gear casing thereof, said casing being rotatably mounted on the spindle of the pedal crank arms, a sprocket rigid with said casing, of a ratchet gear rigid on the periphery of said casing, an extension carried by one of said pedals and projecting into the plane of said ratchet gear, and a pawl loosely pivoted on said extension and adapted to engage and disengage said ratchet when the pedals are operated.

In testimony whereof I have hereto affixed my signature in presence of two witnesses.

FRANCIS DEBNEY JOHNSON.

Witnesses:
M. J. HOLLAND,
SAMUEL RINTEL.

Copies of this patent may be obtained for five cents each, by addressing the "Commissioner of Patents, Washington, D. C."